United States Patent [19]

May

[11] 4,453,385
[45] Jun. 12, 1984

[54] DEVICE FOR REGULATING THE TEMPERATURE OF MATERIALS

[76] Inventor: Georg May, Marienstrasse 54, 605 Offenbach, Fed. Rep. of Germany

[21] Appl. No.: 392,344

[22] Filed: Jun. 25, 1982

[30] Foreign Application Priority Data

Dec. 15, 1981 [DE] Fed. Rep. of Germany ....... 3149624

[51] Int. Cl.³ ............................................. F25B 21/02
[52] U.S. Cl. ............................................ 62/3; 62/457
[58] Field of Search ..................................... 62/3, 457

[56] References Cited

U.S. PATENT DOCUMENTS

| | | | |
|---|---|---|---|
| 3,195,315 | 7/1965 | Boehmer et al. | 62/3 |
| 3,713,302 | 1/1973 | Reviel | 62/3 |
| 4,364,234 | 12/1982 | Reed | 62/3 |

Primary Examiner—Lloyd L. King
Attorney, Agent, or Firm—Koda and Androlia

[57] ABSTRACT

A device for regulating the temperature of a container which is surrounded by a good heat-conducting medium attached to an electro-thermic element, and arranged such that the container can be removed from one side of the device and also inserted into the device on the same side. Also, between the outer surface on one side of the device and the good heat-conducting medium the device has heat insulating material, which material has at least one perforation permitting a container to be inserted into and removed from the good heat-conducting medium.

21 Claims, 10 Drawing Figures

DEVICE FOR REGULATING THE TEMPERATURE OF MATERIALS

BACKGROUND OF THE INVENTION

1. Field of the Invention

This invention relates to a device for regulating the temperature of material in a container which is surrounded by a heat conducting medium.

2. Prior Art

Many materials keep their desired properties only when at a certain temperature. If they are too hot or too cold, they lose their advantageous properties and often become unusable. The sensitivity of materials to temperature variations in the usual range of ambient temperatures from about −40° C. to +50° C. is very diverse. Building materials such as wood, stone or glass only change their properties very little with varying temperatures, while liquid materials with freezing points in the temperature range mentioned change their properties very significantly. Medicaments, and in particular fluid medicaments of high molecular weight, assume a special place among temperature sensitive substances, so that it is most desirable that they are stored at a certain constant temperature. For some medicaments, but also for some other products, it is often important that these products are continuously in the right temperature conditions—even during the transportation of them. In particular, diabetics need properly cooled insulin with which to inject themselves or with which to be injected. It is therefore advantageous to have cooling boxes for insulin ampoules which can be taken in a car or otherwise on one's travels.

A small cooling cell is already known for motor vehicles with air conditioning, which is particularly suitable for taking food, refreshment drinks, the cell having a small space for forced cooling of medicaments and such like, (German Patent Application Laid Open No. 3 004 716). A disadvantage with these cooling cells is that they can only be used in motor vehicles with air-conditioning. Furthermore, a thermo-electric cooling apparatus is known for motor vehicles, having a thermally-insulated chamber cooled by the cold side of an electro-thermic battery, while the hot side of this battery is in a forced air stream, (Soviet Union Pat. No. 615 337). This cooling apparatus is therefore not particularly suitable for use in means of transport.

A cooling apparatus which has a relatively small weight and is transportable is also already known (German accepted Patent Application No. 1 214 254). This cooling apparatus, which can also be used in motor vehicles or on a camp-site, has Peltier cooling elements as a cooling means. However, this apparatus actually has neither a particular internal arrangement nor means which make it suitable for transport.

A Peltier block made up of many elements assembled together is also known (German Patent Application Laid Open No. 1 401 529). On the heat-emitting and/or the heat absorbing side of this block there are arranged receptacles of anodized aluminium. It is however not stated in this Specification whether, and if so how, the Peltier block can be used in a portable cooling box.

The use of a Peltier block in association with a cooling box which is suitable for a motor vehicle is also already known (German Utility Model No. 81 03 411). This cooling box is intended for the cooling of medicaments and has a heat conducting plate on the bottom of a housing to which, inside the apparatus, the Peltier element has its hot surface in heat-conducting contact. The surface of the Peltier element directed away from the plate is in heat-conducting contact with a heat conducting material block, in which at least one recess is provided for the reception of medicaments. It is not obvious how this known cooling box can be fixed in a motor vehicle, whether it can be carried, and how the medicaments are put in it.

A device with which milk bottles or the like can be thermo-electrically heated or cooled and in which details of the reception space for radially-cooled goods are shown, is also know (U.S. Pat. No. 2,959,925). In any event, this device is hardly transportable and is thus barely suitable for use in the cooling of medical materials in a car or during vacation.

A special electro-thermic cooling arrangement provided for the cooling of insulin ampoules which is constructed in a compact and transportable form is also know (U.S. Pat. No. 3,713,302). This cooling arrangement can be operated for several days by means of electrical batteries, without these batteries needing to be changed in the meantime. Nevertheless, this known cooling arrangement can only take one insulin flask. In addition, the removal of the flask is somewhat laborious, as a sliding cover has to be removed.

Finally, an arrangement is also known with which it is possible to use a Peltier element, both as a heating and as a cooling element, which serves to adjust the temperature of a medicament. The flask containing the medicament is nevertheless accessible only with difficulty (U.S. Pat. No. 3,858,106).

SUMMARY OF THE INVENTION

The invention aims at reducing the problem of producing a compact and all-round well-insulated cooling box, in which it is simple to remove and insert the container carrying the material to be cooled.

Accordingly, this invention provides a device for regulating the temperature of material in a container which is surrounded by a good heat-conducting medium attached to an electro-thermic element, and arranged such that the container can be removed from one side of the device and also inserted into the device on the same side, characterised in that between the outer surface on said side of the device and the good heat-conducting medium the device has heat insulating material, which material has at least one perforation permitting a container to be inserted into and removed from the good heat-conducting medium.

BRIEF DESCRIPTION OF THE DRAWINGS

By way of Example only, one specific embodiment of this invention will now be described in detail, reference being made to the accompanying drawings, in which:

FIG. 6 shows the back wall of the device according to the invention with the cooling fins and with a metal block for the reception of the insulin ampoules or the like;

DETAILED DESCRIPTION OF THE INVENTION

Figure 1:
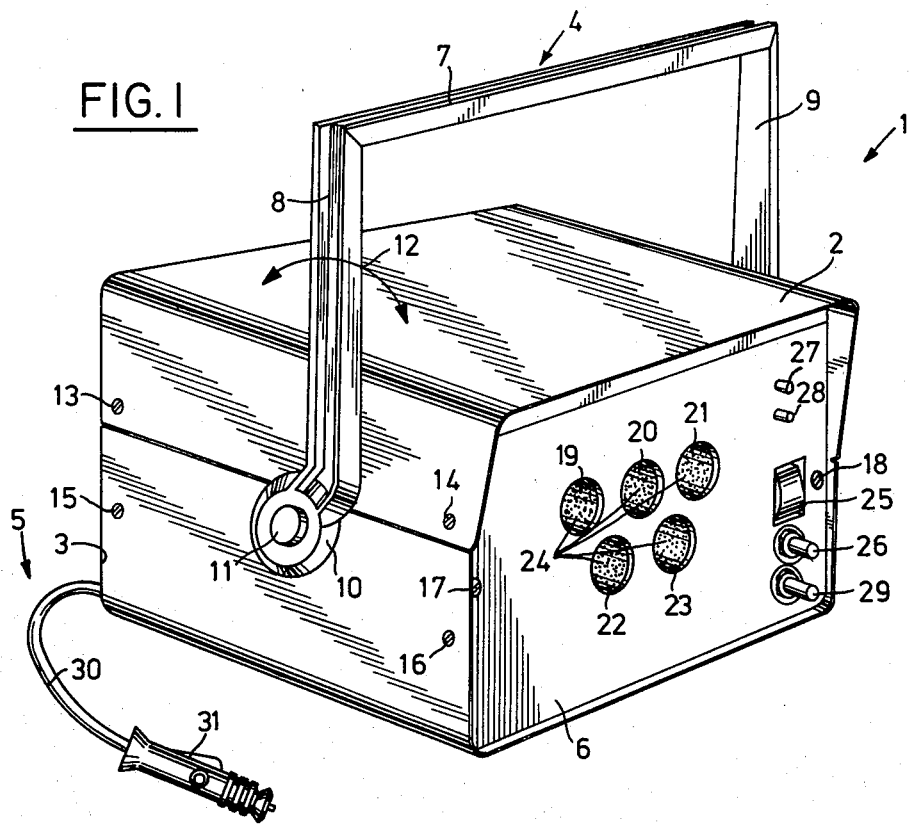
FIG. 1 is a perspective general view of the device according to the invention.

In FIG. 1 there is shown an apparatus 1 in accordance with the invention, which serves for the cooling and/or the heating of materials, but in particular for liquid medicaments. This apparatus has an upper half shell 2 and a lower half shell 3, a carrying handle 4, an electrical connection 5 and a front plate 6. The carrying handle 4 actually comprises a cross bar 7 and two upright arms 8 and 9, these arms 8 and 9 being attached by movable bearings to the shell, only one bearing 10 being visible in FIG. 1. These bearings have push buttons 11, which when pressed permit the movement of the carrying handle 4 in the directions of the arrow 12. In this way, by releasing the push button 11 the carrying handle 4 can be fixed in the position at which it has been set. The two half-shells 2 and 3 are fastened together on the side visible in FIG. 1 by screws 13, 14, 15 and 16. The same thing holds also for the front plate 6, which is fastened by place by means of screws 17 and 18. There are five perforations 19, 20, 21, 22 and 23 in the front plate 6, behind which a plate 24 of heat insulation material (for instance of 'Styropor') provided with five perforations can be seen. In addition, the front plate 6 carries an on/off switch 25, a fuse button 26 and two light-emitting diodes 27 and 28, by which the various operational conditions can be shown—for example "power" and "temperature regulation". Also on the front plate there is a rotatable know 29 by which the required temperature can be set, but the rotatable knob 29 can be ignored when the temperature to be regulated is pre-determined. This is sometimes the case when the apparatus 1 is to be used solely for keeping insulin at the right temperature. The electric connection 5 comprises in the usual way a cable 30 and a plug 31.

Figure 2:
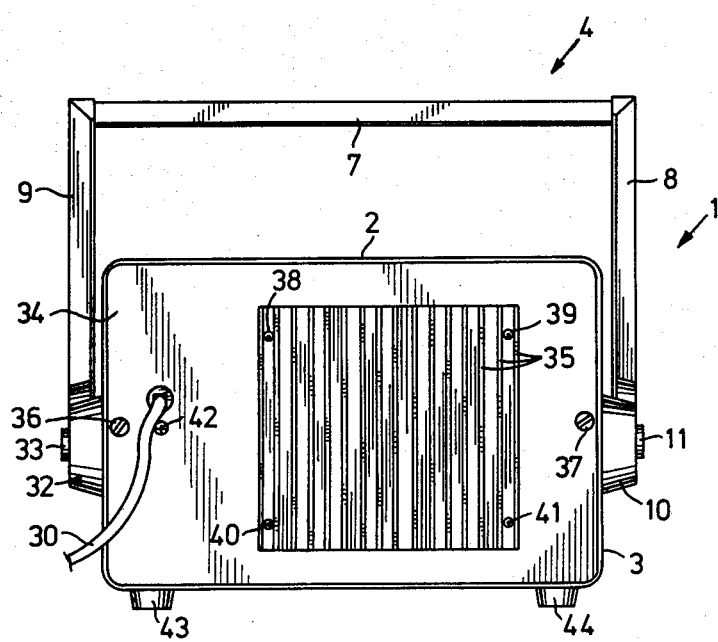
FIG. 2 is a back view of the device according to the invention.

FIG. 2 shows the apparatus shown in FIG. 1, from the rear. In addition to the above described constructional parts there is additionally shown the second bearing 32 and the second push button 33, as well as a back wall 34 with cooling fins 35. The back wall 34 is fastened by means of screws 36 and 37, while the cooling fins are formed in a block 35 attached to the back wall 34 by means of screws 38, 39, 40 and 41, the ends of which can be seen in FIG. 2. The cross-slotted screw 42 in the back wall serves to fasten a particular part inside the apparatus 1. Four feet are attached to the lower half-shell 3, the two rear feet 43 and 44 being visible in FIG. 2.

Figure 3:
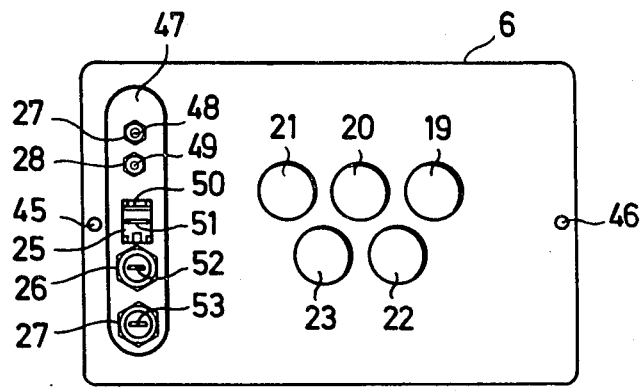
FIG. 3 shows the front plate of the apparatus according to the invention, from the back.

FIG. 3 shows the front plate 6, from behind. Here again the perforations 19 and 23 can be seen, as well as the holes 45 and 46 for the screws 17 and 18. A recess 47 is provided on the back of the front plate 6, in which the parts 25, 26, 27, 28 and 29 with their electrical connections 48 to 53 are located.

Figure 4:
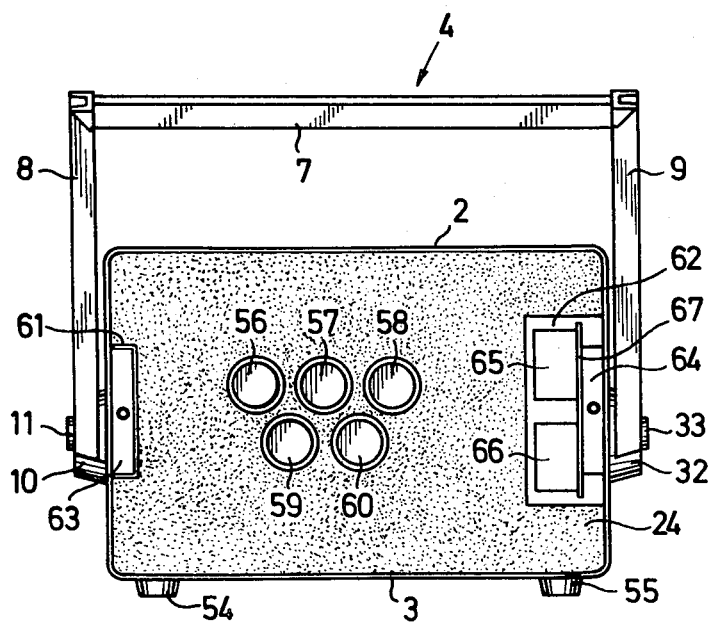
FIG. 4 shows the front side of the device according to the invention, but with the front plate removed.

FIG. 4 shows the apparatus 1 represented in FIG. 1, again from the front but with the front plate 6 removed. In this view can be seen the two front feet 54 and 55, as well as the heat insulating plate 24 with the openings 56, 57, 58, 59 and 60 therein, which line up with the openings 19 to 23 in the front plate 6. The heat-insulating plate 24 has on its sides cut-outs 61, and 62, in which are located side pieces 63 and 64 for fastening together the two half-shells 2 and 3, mounting the carrying handle 4, the front plate 6 and other constructional parts. The cut-out 62 is somewhat larger than the cut-out 61, because some additional devices are mounted on the side piece 64, for example an electronic circuit 65 for the regulation of the temperature as well as an accumulator 66 and a conductor plate 67.

Figure 5:
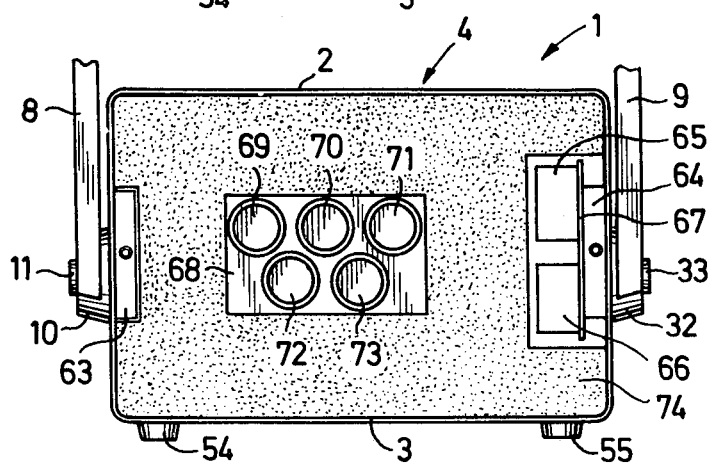
FIG. 5 shows the front side of the device according to the invention with the front plate and the front temperature insulating layer removed.

FIG. 5 shows the apparatus 1 with the heat-insulating plate removed. There can now be seen a metal block 68 of aluminium or of another good heat conducting material, which block has five conical holes 69 to 73, which serve to receive insulin ampoules or the like. The holes 69 and 73 are made conical because in this way the production of the metal block is much simplified; it is possible to produce the conical holes in the diecasting process, so that expensive drilling processes are unnecessary. On the inner face of the back wall 34 of the apparatus 1 there is a further heat-insulating plate 74 which is connected to the other heat-blocking plate 24 (FIG. 4).

Figure 6:
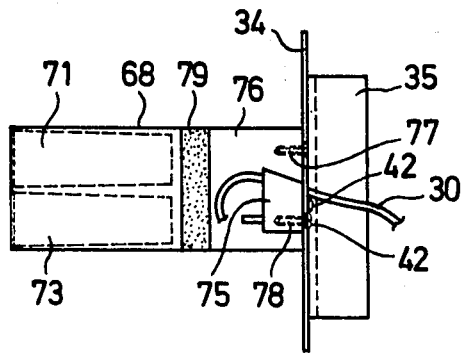

As can be seen from FIG. 6 showing a side view of the metal block 68, the metal block 68 is indirectly attached to the back wall 34, which wall has the above-mentioned cooling fins 35 mounted thereon. The screw 42 holds a plastic carrier 75 for the cable 30. A further metal block 76 is directly attached to the back wall 34 by means of screws 77 and 78. This metal block 76 is thermally connected with Peltier elements, which are located behind a heat-blocking ring 79. These Peltier elements are also in contact with the metal block 68. The metal block 68 is shown sectioned in FIG. 6, so that two conical holes 71 and 73 are seen.

Figure 7:
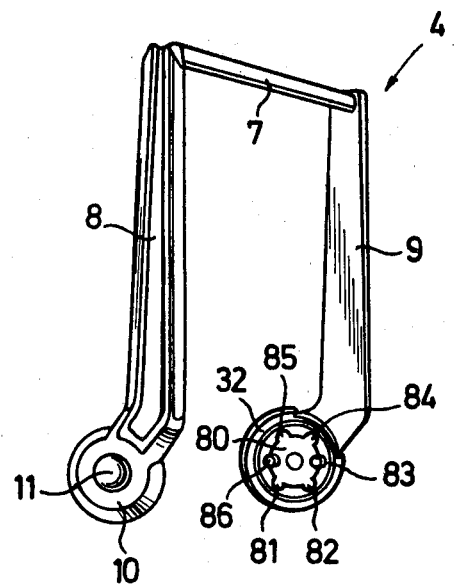
FIG. 7 is a perspective view of the carrying handle of the device according to the invention.
Figure 8:
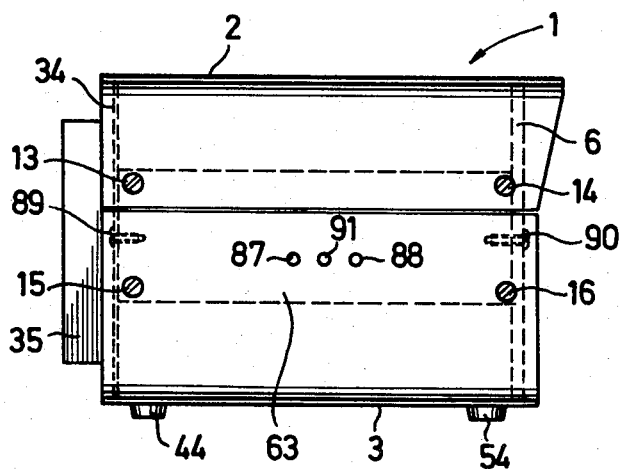
FIG. 8 is a side view of the device according to the invention.

In FIG. 7, the carrying handle 4 is shown in perspective, removed from the apparatus 1. The bearing 32 has a rotatable part 80 with six projections 83 and 86 have in addition two pins which engage in holes in the apparatus housing. Such holes 87 and 88 can be seen in FIG. 8, which is a side view of the apparatus. In FIG. 8, there are also represented in broken lines the side piece 63, the front plate 6 and the back wall 34, the front plate 6 and the back wall 34 being attached to the side piece 63 by means of screws 89 and 90 respectively. The hole 91 is provided for the bearing 10, to be attached by a screw from inside the housing.

Figure 9:
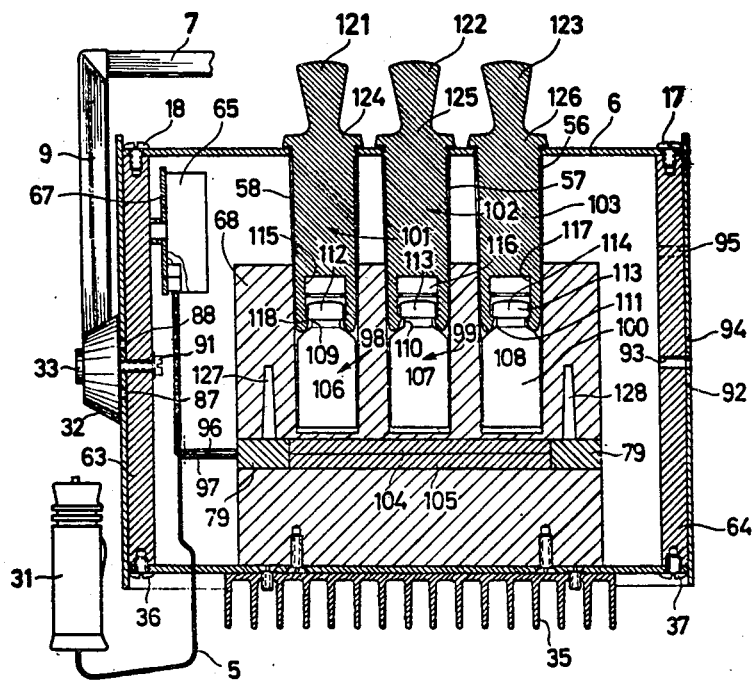
FIG. 9 is a partially cut away plan view of the device according to the invention.

FIG. 9 shows the apparatus 1 from above, partly in section. Here there can be seen the various holes in the side piece 63 for the screws by which the various constructional parts are attached to each other. In the side piece 64, the corresponding holes are 92 to 95.

The cable 5, which can be connected to an electrical system, is connected to the electronic circuit 65 which contains a regulation circuit for the regulation or control of the Peltier elements. This regulation circuit is connected to conductors which transmit information about the actual temperature of the metal block 68. Further, it is connected with current supply conductors, which according to the operation of the regulating circuit, resulting from actual and desired values, provide current to the Peltier elements. Current control or regulation then takes place which also considers the direction of the current flow, because, as already mentioned, Peltier elements can achieve not only cooling, but also heating should the need arise. With temperature control for insulin, it is true that cooling is the normal case, because the temperature at which insulin should be stored lies below the average middle European or North American temperature; however, there are in many parts of the world winter temperatures which vary from −10° C. to −50° C., so that there insulin taken in a motor vehicle must be heated.

The conductors which feed the Peltier elements with current are indicated at 96 in FIG. 9, and they lie in a canal 97 which is provided for them in the Styropor. Also in the electronic circuit 65 is a charging circuit which is connected to an accumulator or a nickel-cadium battery. The accumulator or the nickel-cadium battery can then be charged from the mains but when no mains are available, can be used as a source of energy.

The metal block 68 is shown sectioned, so that insulin ampoules 98, 99 and 100 can be seen in the conical holes 56, 57 and 58. On the end face of the metal block 68 Peltier elements 104 and 105 are provided, supported by the metal block 76. Each ampoule 98 to 100 has a cylindrical main body 106 to 108, conjoined to which is a neck 109 to 111 and an ampoule head 112 to 114 respectively. Grippers 101 to 103, made out of elastic material (for example, from rubber) have respective mantles 115 and 117 at their lower ends with ring-shaped snap elements 118 to 120, which engage the necks 109 to 111 of the ampoules 98 to 100 respectively. At their front ends, each gripper 101, 102 and 103 has a truncated cone-shaped handle 121, 122 and 123 respectively, with a shoulder 124, 125 and 126.

The introduction or the removal of an ampoule into or out of the metal block 68 takes place by pulling a gripper, for example on the handle 121, whereupon the gripper together with its ampoule is withdrawn. The ampoule can now easily be released from the gripper by pulling for example the ampoule 98 away from the gripper 101. During this, the elastic snap element 118 expands and releases the head 112 of the ampoule 98. If the ampoule 98 is emptied and if the gripper is to be provided with a new ampoule, then it is only necessary to press the head of the new ampoule against the lower end of the mantle 115, whereupon the snap element 118 expands and receives the head of the new ampoule. The holes in the metal block 68 are so dimensioned that, for example, the various ampoules which are common in Europe, in the United States or in other lands, can be accepted. The same thing applies to the grippers, which because of their elasticity are suitable to take various kinds of ampoules.

In order to determine the actual temperature of the metal block 68, recesses 127 and 128 are provied in which temperature sensors can be housed.

The Peltier effect is made use of for the temperature regulation and is suitable, as already mentioned, both for heating and for cooling. It is known that this effect, which is the inverse of the Seebeck effect, depends on temperature differences being produced by electrical energy. A current which flows through a circuit of different conductors causes such a temperature difference. Apparatus using this effect is someties referred to as a heat-pump or a cooling plate. The Peltier effect makes itself evident as a temperature increase for one direction of current, but for the other however as a temperature reduction—that is to say, in a circuit of two different conductor materials, an electric current produces a temperature difference at the place of contact of the two conductors and hence a temperature gradient in the whole conductor circuit. A thermo-element is designated as a Peltier element when it makes use of the Peltier effect, such an element is preferably produced from semi-conducting material. This thermo-element can equally be used for cooling—so-called Peltier-cooling—and for heating—so-called Peltier-heating. In order to achieve a large temperature reduction, for example up to 50° C., with cooling power the effectiveness must be as large as possible; that is to say, semiconductor materials at the beginning of the so-called degeneration region must be used.

If several Peltier elements each of a p-conducting and n-conducting semi-conductor are connected electrically in series but thermally in parallel, a so-called Peltier-cell is obtained, which is usable as a cooling element for spatially limited cooling purposes or as a heat pump. In the present invention it is preferred to use Peltier cells. Because the quantity of heat which is produced by or removed by Peltier elements is proportional to current and time, the temperature of the metal block 68 can be regulated by regulating the current.

Figure 10:
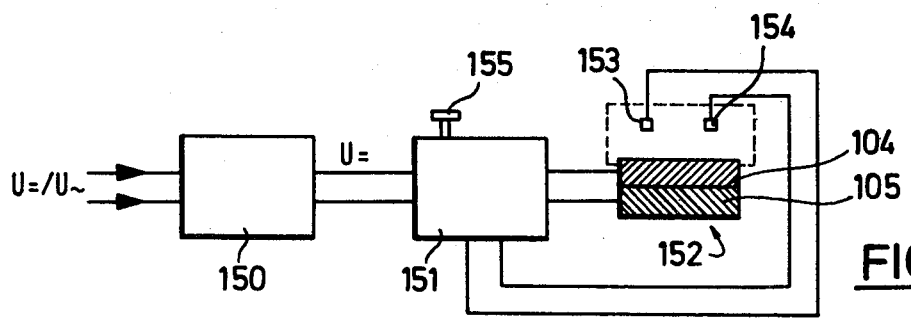
FIG. 10 is a block diagram of a temperature regulating arrangement.

FIG. 10 shows a block diagram of a circuit which enables energy supply and regulation in the device according to the invention. The block 150 represents a circuit arrangement which is provided for the supply of energy. It includes an arrangement which, when a suitable main d.c. supply is connected, passes that supply on practically unchanged to the regulation device. If an unsuitable d.c. of if an a.c. supply is applied, this is transformed in a suitable manner. In the block 150 there is also provided an accumulator or a nickel-cadium battery which can be charged from the mains, so it is possible to operate the regulation device from the accumulator or the nickel-cadium battery. The circuitry in the block 150 thus enables the apparatus 1 to be operated practically from all d.c. and a.c. mains or by an accumulator. Such circuitry is already known and hence does not need to be more closely described (see for example, German Patent Application No. 29 48 054, or Boschert: 'Flyback converters, solid-state solution to low-cost switching power supplies', ELECTRONICS, Dec. 21, 1978, pages 100–104).

The Peltier cell is symbolically represented at 152 in FIG. 10 and is connected to the regulation device 151 to which are also connected measuring sensors 153 and 154 yielding the actual temperature value, which sensors are provided in recesses in the block 68. The sensors 153 and 154 could be negative temperature coeffecient thermistors. There is also an adjustment 155, with which the required value of the temperature can be set. In certain cases, this adjustment is not required, namely when the required value is always the same.

Regulating circuitry for the regulation of the temperature is generally known, (see for example, Beuth/Schmusch 'Basic circuits of Electronics', Electronik 3, 4, 1981 edition, pages 316–318) and therefore does not need to be described in detail. The present regulating circuitry differs from most known regulating circuits only in that not only an increase or decrease in current with constant polarity is produced, but that the regulating current which is supplied to the Peltier cells in certain cases also undergoes a sign reversal.

It is understood that the invention is not limited to the above-described example. Thus the housing of the device which is here described as a two-shell housing with half-shells 2 and 3, could also be produced in one or several pieces. Also the fastening together of the half-shells 2 and 3 does not have to be done with the side pieces 63 and 64, but could be achieved with any desired means of connection. Furthermore—and this is in fact a particularly advantageous arrangement—the back wall with the cooling fins and the metal block 76 could be formed in one integral unit. The metal block 68 can also on grounds of economy of materials have a shape departing from the rectangular from, perhpas to have a perimeter following the edges of the holes 56 to 60. Furthermore, the shape of the gripper is not limited to the form represented in the described embodiment. Many other designs of gripper are possible which need not have the gripping sleeve, and for example may have a truncated cone-like end at the front, which when pressed agains the head of an insulin ampoule attaches itself on this head. This in fact represents a particularly advantageous solution, because in this way the most various sorts of ampoules can be pushed into the metal block and again withdrawn therefrom. The gripper also is not limited to be made of an elastic rubber, but could instead be rigid and contain magnets. If a material responsive to a magnetic field of force is provided on the ampoules, the ampoules can be inserted and withdrawn by means of a permanent magnet in a gripper. The ampoules do not themselves need to contain the magnetic material; instead they can, for example, be surrounded by an open or closed iron casing in which they can easily be inserted.

Furthermore, adapters can be provided which enable the apparatus to be connected to various electrical outlets, for example, to cigarette lighters in motor vehicles. Instead of two light emitting diodes, three diodes of this sort can be provided, one diode showing heating operation, one diode cooling operation and one diode non-operation.

It is advantageous to produce the back wall with the cooling fins and the metal block supporting the Peltier elements as a single unit, by a die-casting process. Further variations of the described embodiment are possible within the scope of the inventive concept.

I claim:

1. A device for regulating the temperature of material in a container which is, in turn, surrounded by a good heat-conducting medium attached to an electro-thermic element and arranged such that the container can be removed from one side of the device and also inserted into the device on the same side, characterized in that between the outwardly directed surface of said side of the device and the good heat-conducting medium an insulation of a predetermined thickness is provided, said insulation having at least one perforation permitting a container to be inserted into and removed from the good heat-conducting medium, and that a gripper is provided, the length of which is at least the same as the thickness of the insulation and by means of which the container can be removed and/or inserted.

2. A device according to claim 1, characterized in that the gripper has at one end a handle and at its other end a gripping device adapted for connection to a container.

3. A device according to claim 2, characterized in that the gripper has a shoulder provided between the handle and the gripping device, which shoulder may bear on a plate of the device.

4. A device according to claim 2, characterised in that the gripping device is generally cylindrical and has an internal snap edge for engaging a container.

5. A device according to claim 2, characterized in that the gripper is made of rubber.

6. A device according to claim 2, characterized in that the container is an ampoule having a substantially cylindrical body and a head arranged such that between the head and body there is a groove.

7. A device according to claim 2, characterized in that the good heat-conducting medium is a metal block with at least one recess to receive a container.

8. A device according to claim 7, characterized in that said recess has a conical form.

9. A device according to claim 7, characterized in that recesses are provided in the metal block for receiving temperature sensors.

10. A device according to claim 9, characterized in that the temperature sensors are termistors.

11. A device according to any of claim 7, wherein the good heat-conducting medium is in the form of a metal block with at least one recess for a container, which block is produced by a die-casting process.

12. A device according to claim 7, characterized in that the electro-thermic element operates on the Peltier effect.

13. A device according to claim 7, characterized in that a regulating arrangement is provided which causes the electrothermic element to serve either as a heating or as a cooling element.

14. A device according to claim 7, characterized in that the device is provided with a front plate which carries optical indicating devices for different modes of operation.

15. A device according to claim 7, characterized in that the good heat-conducting medium is surrounded with insulation means up to the place where the electro-thermic element is attached to the good heat-conducting medium.

16. A device according to claim 15, characterized in that the insulation means consists of styropor.

17. A device according to claim 7, characterized in that the device has a rectangular housing with a front plate through which a container may be inserted or removed, and has a carrying device.

18. A device according to claim 17, characterized in that the carrying device comprises an adjustable carrying handle which can be secured in any one of a number of positions.

19. A device according to claim 18, characterized in that a release knob is provided which must be depressed to allow the position of the carrying handle to be changed.

20. A device for regulating the temperature of material in a container which is surrounded by a good heat-conducting medium attached to an electro-thermic element and arranged such that the container can be removed from one side of the device and also inserted into the device on the same side, characterized in that at least one gripper is provided by means of which the container can be removed and/or inserted and in that the device is provided with a back wall which is in thermal contact with cooling fins and with a heat conducting block associated with the electro-thermic element.

21. A device according to claim 7, characterized in the device is provided with a back wall which is in thermal contact with cooling fins and with a heat conducting block associated with the electro-thermic element.

* * * * *